United States Patent [19]

Nelsen et al.

[11] Patent Number: 4,683,753

[45] Date of Patent: Aug. 4, 1987

[54] VIBRATION DETECTOR

[75] Inventors: Christopher P. Nelsen, Laurinburg; Robert L. Melton, Sanford, both of N.C.

[73] Assignee: Dana Corporation, Toledo, Ohio

[21] Appl. No.: 789,138

[22] Filed: Oct. 18, 1985

[51] Int. Cl.[4] ............................................. G01N 29/00
[52] U.S. Cl. ........................................ 73/655; 340/65
[58] Field of Search .................. 73/655, 653; 340/65, 340/571, 556, 566; 356/249

[56] References Cited

U.S. PATENT DOCUMENTS

| | | | |
|---|---|---|---|
| 1,082,014 | 12/1913 | Digby et al. | 73/655 |
| 3,044,343 | 7/1962 | Poitevin de Fontguyon | 356/249 |
| 4,068,222 | 1/1978 | Treviranus | 340/556 |
| 4,214,485 | 7/1980 | Berger et al. | 73/655 |

FOREIGN PATENT DOCUMENTS 23580 of 1910 United Kingdom ................. 73/655

*Primary Examiner*—Anthony V. Ciarlante
*Attorney, Agent, or Firm*—MacMillan & Sobanski

[57] ABSTRACT

The present invention concerns a unique vibration detector for sensing movement or vibration of an associated object. The detector includes an infrared light transmitter positioned to direct light toward a reflective fluid mass such as, for example, mercury. A cooperating infrared receiver is positioned to receive at least a portion of the light reflected off the fluid mass. As the object and detector are vibrated, the surface of the fluid will be disturbed, thus varying the amount of light energy detected by the receiver. In the preferred embodiment of the invention, the fluid mass of mercury is contained within a cylindrical chamber having a relatively small diameter such that the upper surface of mercury provides a generally convex-shaped reflecting surface. The vibration detector can be utilized, for example, in a vehicle anti-theft system.

11 Claims, 4 Drawing Figures

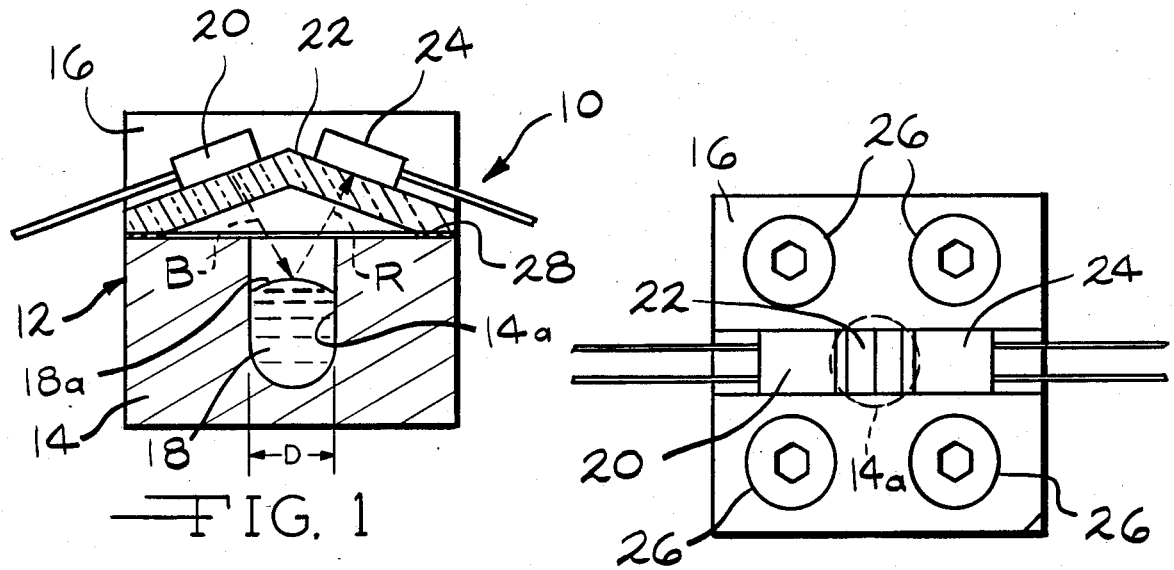
FIG. 1
FIG. 2
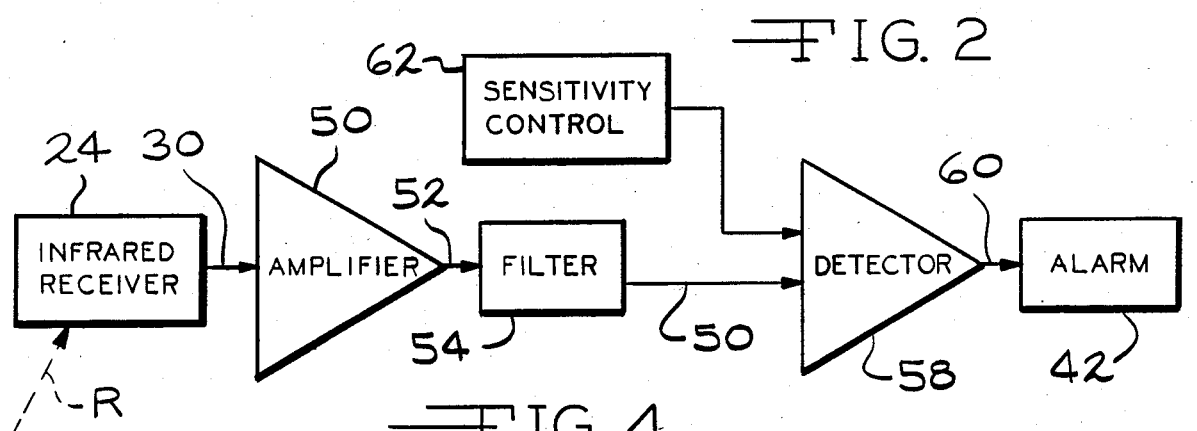
FIG. 4
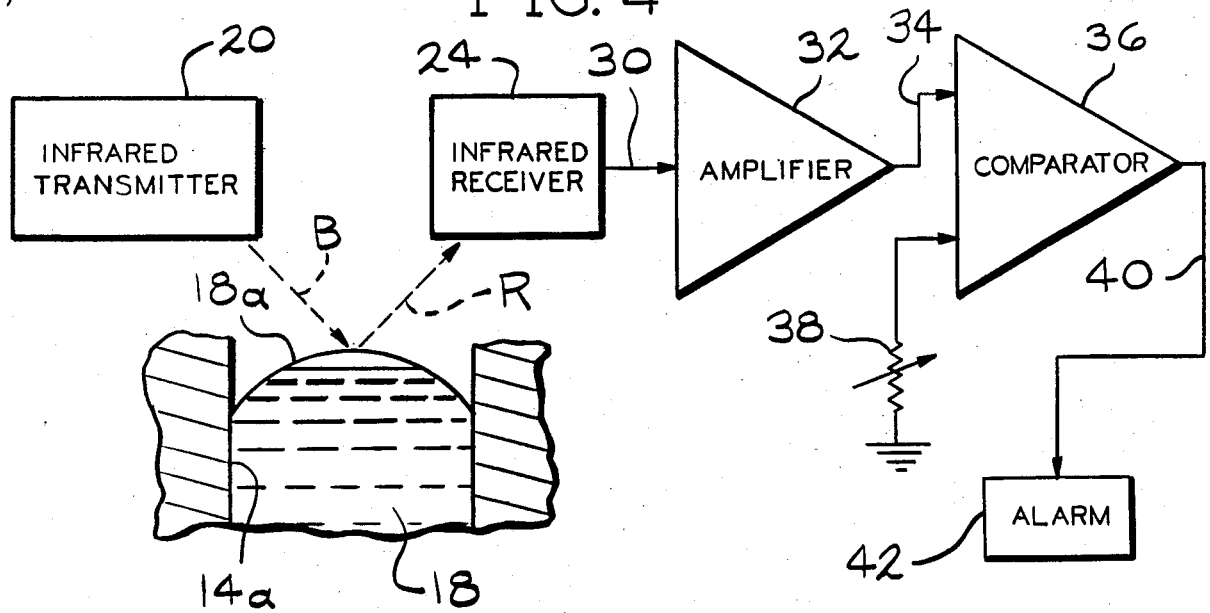
FIG. 3

VIBRATION DETECTOR

BACKGROUND OF THE INVENTION

The present invention relates in general to a device for sensing the vibration of an object and, in particular, to a device which detects vibration by sensing disturbances in a fluid mass.

Various devices have been proposed which utilize a fluid mass for the purpose of detecting vibration of an associated object. For example, U.S. Pat. No. 1,082,014 to Digby et al discloses a vibration sensor which includes a receptacle containing a liquid, and a reflector element positioned in horizontal contact with but not submerged in the liquid. In this sensor, a beam of light is directed onto the upwardly facing surface of the reflector element, and a screen is positioned to receive the reflected beam. As the sensor is subject to vibration, the surface of the liquid will be disturbed, thus altering the angular orientation of the reflector element and varying the position of the reflected beam on the screen.

Another type of vibration sensor which utilizes a fluid mass is disclosed in U.S. Pat. No. 4,214,485 to Berger et al. In this patent, the sensor includes a light source adapted to transmit light through a container filled with a liquid, and a detector is mounted to receive light having passed through the surface of the liquid. As the container is vibrated, or the angular relationship of the surface of the liquid with respect to the incident light rays is varied, the light transmissive and refractive properties of the liquid surface are altered, thereby altering the output of the light detector.

A light transmitter and detector system has also been utilized in conjunction with a fluid mass for other applications. For example, U.S. Pat. No. 3,044,343 to Poitevin de Fontguyon discloses an optical instrument for use as a leveling device. In this device, a beam of light is directed onto and reflected from the surface of a container containing mercury. The tank can be fixed to an object to detect relative movement thereof. The light being reflected off the mercury can be utilized to level the object.

SUMMARY OF THE INVENTION

The present invention concerns a unique vibration detector for detecting movement or vibration of an associated object. In accordance with the present invention, an infrared light transmitter is positioned to direct light toward a reflective fluid mass such as, for example, mercury. A cooperating infrared receiver is positioned to receive at least a portion of the light reflected off the fluid mass. The amount of light energy detected by the receiver will vary in accordance with the amount of surface distortion of the fluid mass. In the preferred embodiment of the invention, the fluid mass of mercury is contained within a cylindrical container having a relatively small diameter such that the upper surface of mercury provides a generally convex-shaped reflecting surface.

The vibration detector of the present invention can be utilized, for example, in a vehicle anti-theft system. In this type of system, the fluid mass is contained within a housing which is securely fastened to the vehicle body such that vibrations or other motions imparted to the vehicle during an attempted theft or breakin will cause the surface of the fluid mass to be disturbed. The receiver generates a signal which varies with the amount of light sensed by the receiver and consequently, the amount of vibration or other motion of the vehicle. An electric circuit compares the receiver output signal with an adjustable reference signal representing a predetermined amount of vibration. When this predetermined amount of vibration has been exceeded, the circuit generates a trigger signal to activate an associated alarm device.

BRIEF DESCRIPTION OF THE DRAWING

The above features of the present invention will become readily apparent to one skilled in the art from reading the following detailed description of the invention in conjunction with the attached drawings, in which:

FIG. 1 is a sectional view of the vibration detector according to the present invention, illustrating the positions of the infrared transmitter and receiver relative to the fluid mass of mercury;

FIG. 2 is a top plan view of the vibration detector shown in FIG. 1; and

FIG. 3 is a block diagram illustrating an electric alarm circuit which can be utilized with the detector of the present invention; and FIG. 4 is a block diagram of an alternate embodiment of an electric alarm circuit which can be utilized with the detector of the present invention.

DESCRIPTION OF THE PREFERRED EMBODIMENT

Referring to FIGS. 1 and 2, there is shown a preferred embodiment of a vibration detector 10 according to the present invention. The detector 10 includes a two piece housing 12 comprised of a lower member 14 and an upper member 16. The lower member 14 is provided with a chamber 14a which contains a supply of a fluid mass 18 which can be mercury, for example. In the preferred embodiment of the invention, the chamber 14a is generally cylindrical and of a relatively small diameter D such as, for example, approximately 0.25 inches. Such a construction causes the upper reflective surface 18a of the mercury to be generally convex and minimizes the amount of mercury required. While the embodiment shown in the drawings illustrates the surface 18a as generally convex, it will be appreciated that, in some instances, it may be desirable to provide a flat reflecting surface.

The upper member 16 is adapted to support an infrared transmitter 20 to direct a beam of infrared light (represented by dashed line B) downwardly through a window 22 onto the upper reflective surface 18a. A portion of the light (represented by dashed line R) is reflected upwardly therefrom through the window 22 and is received by an infrared receiver 24.

The upper member 16 can be secured relative to the lower member 14 by means of a plurality of spaced apart threaded fasteners 26. A gasket 28 can be positioned between the facing surfaces of the upper and lower members to sealingly contain the mercury within the chamber 14a.

The light generated by the transmitter 20 will be incident upon the upper surface 18a and a portion of the reflected light will be received by the receiver 24. When the detector 10 is stationary, the intensity of the light received by the receiver 24 will be at a predetermined constant level. As the detector 10 is vibrated or otherwise moved, the surface 18a will be disturbed, thereby altering the intensity of the light received by the receiver 24. Typically, the receiver 24 will generate an output signal at a voltage level inversely proportional to the intensity of light received. This voltage level thus provides an indication as to the vibration to which the unit is subjected.

The present invention is especially suited for use as a vibration detector in a vehicle anti-theft system. In this type of system, shown in the block diagram of FIG. 3, it is desirable to trigger an associated alarm when the vibration or movement to which a vehicle is subjected exceeds a predetermined level.

In FIG. 3, the infrared transmitter 20 directs light onto the convex upper surface 18a of mercury 18 which light is then reflected upwardly to the infrared receiver 24. The detector 10 is securely fastened to the vehicle body (not shown) such that any movement or vibration of the vehicle during an attempted theft or breakin causes disturbances in the upper reflective surface 18a. The infrared receiver 24 generates an output signal on a line 30 at a voltage level inversely proportional to the intensity of the light received. The level of the signal on the line 30 is amplified by an amplifier 32 and is supplied on a line 34 as one input to a comparator 36. The second input of the comparator is connected to receive a reference signal having a voltage level which can be adjusted by a potentiometer 38. When the level of the signal on the line 34 exceeds the level of the reference signal, the comparator 36 will generate a trigger signal on a line 40 which can be utilized to actuate an alarm 42. The potentiometer 38 is utilized as a sensitivity control to set the predetermined level of vibration which must be exceeded prior to activating the alarm.

An alternate embodiment of the electric alarm circuit which can be utilized with the detector of the present invention is shown in FIG. 4. As previously mentioned, the infrared receiver 24 generates an output signal on the line 30 having a voltage level which is inversely proportional to the intensity of the light received. Thus, as the detector 10 is subject to vibration, the surface 18a is disturbed in accordance with the frequency of vibration to which the detector is subjected, and the output signal is generated at a frequency representing the frequency of vibration of the detector. It has been found that the frequency of the output signal is representative of the type of vibration to which the vehicle is subjected. For example, relatively low frequency signals are typically indicative of vehicle motions not associated with an attempted theft, such as motion caused by a passing truck, while higher frequency signals are typically associated with an attempted breakin.

The electric alarm circuit of FIG. 4 is similar to the circuit of FIG. 3, except the circuit of FIG. 4 is specifically designed to monitor the frequency of the detector output signal. In FIG. 4, the output of the receiver 24 is supplied to an amplifier 50 having an output line 52 connected to a filter 54. The filter 54 can be designed to eliminate or reduce those frequency ranges which are typically not associated with an attempted breakin. The output of the filter 54 is supplied on a line 56 to a detector 58 which, upon receiving a filter output signal representing a predetermined amount of vibration, generates a trigger signal on a line 60 to activate the alarm 42. A sensitivity control 62 can be connected to the detector 58 to adjust the level of sensitivity of the detector.

In accordance with the provisions of the patent statues, the principle and mode of operation of the present invention have been illustrated and described in what is considered to represent its preferred embodiment. However, it should be understood that the present invention can be practiced otherwise than as specifically illustrated and described without departing from the scope of the attached claims.

What is claimed is:

1. A device for sensing vibration and motion of an object, said device comprising:
   means secured to the object for containing a fluid mass having an upwardly facing reflective surface;
   means for directing a beam of light toward the upper surface of the fluid mass to cause at least a portion of the beam to be reflected therefrom;
   means for receiving a reflected portion of the beam, said receiving means being responsive to the reflected portion for generating an output signal representing a characteristic of the reflected portion, such that vibration of the fluid mass produces disturbances in the upper surface thereof, thus causing the output signal of the receiving means to vary as the fluid mass is vibrated;
   filter means for filtering a portion of the output signal to generate a filtered output signal representing a predetermined range of frequencies of vibration of said fluid mass;
   reference means for generating a reference signal representing a predetermined amount of vibration;
   threshold means responsive to said flitered output signal and said reference signal for generating a trigger signal when the level of vibration represented by said filtered output signal exceeds said predetermined amount represented by said reference signal.

2. The device according to claim 1 wherein said fluid mass is provided with a generally convex-shaped continuously curved upper surface.

3. The device according to claim 1, including means for adjusting the level of said reference signal.

4. The device according to claim 1 wherein said means for directing said beam of light includes an infrared transmitter, and said receiving means includes an infrared receiver.

5. The device according to claim 1 wherein said fluid mass is mercury.

6. The device according to claim 1 wherein said containing means includes a cylindrical chamber for containing said fluid mass.

7. An anti-theft system for an object, said system comprising:
   a vibration detector secured to the object for sensing vibration and motion of the object;
   said vibration detector including means for containing a fluid mass having an upwardly facing reflective surface;
   light emitting means for directing a beam of light toward the upper surface of the fluid mass to cause at least a portion of the beam to be reflected therefrom;
   receiver means for receiving a reflected portion of the beam said receiver means being responsive to the reflected portion for generating an output signal representing a charcteristic of the reflected portion, such that vibration and motion of the fluid mass produce disturbances in the upper surface thereof, thus causing said output signal of said receiver means to vary as the fluid mass is vibrated;
   filter means for filtering a portion of said output signal and generating a filtered output signal representing a predetermined range of freuqencies of vibration of the fluid mass;

threshold means responsive to said filtered output signal for generating a trigger signal when the level of vibration represented by said filtered output signal exceeds a predetermined amount; and alarm means responsive to said trigger signal for indicating that the object has been subjected to said predetermined amount of vibration.

8. The device according to claim 7 including means for generating a reference signal representing said predetermined amount of vibration, and said means for generating said trigger signal includes means threshold responsive to said reference signal and said filtered output signal for generating said trigger signal.

9. The device according to claim 8 including means for adjusting the level of said reference signal.

10. The device according to claim 7 wherein said containing means includes a cylindrical chamber for containing said fluid mass.

11. The device according to claim 7 wherein said fluid mass is mercury.

* * * * *